March 10, 1970  G. BERZ  3,499,640
CHUCK ASSEMBLY FOR AUTOMATIC WAFER DIE SORT MACHINE
Filed Aug. 3, 1967
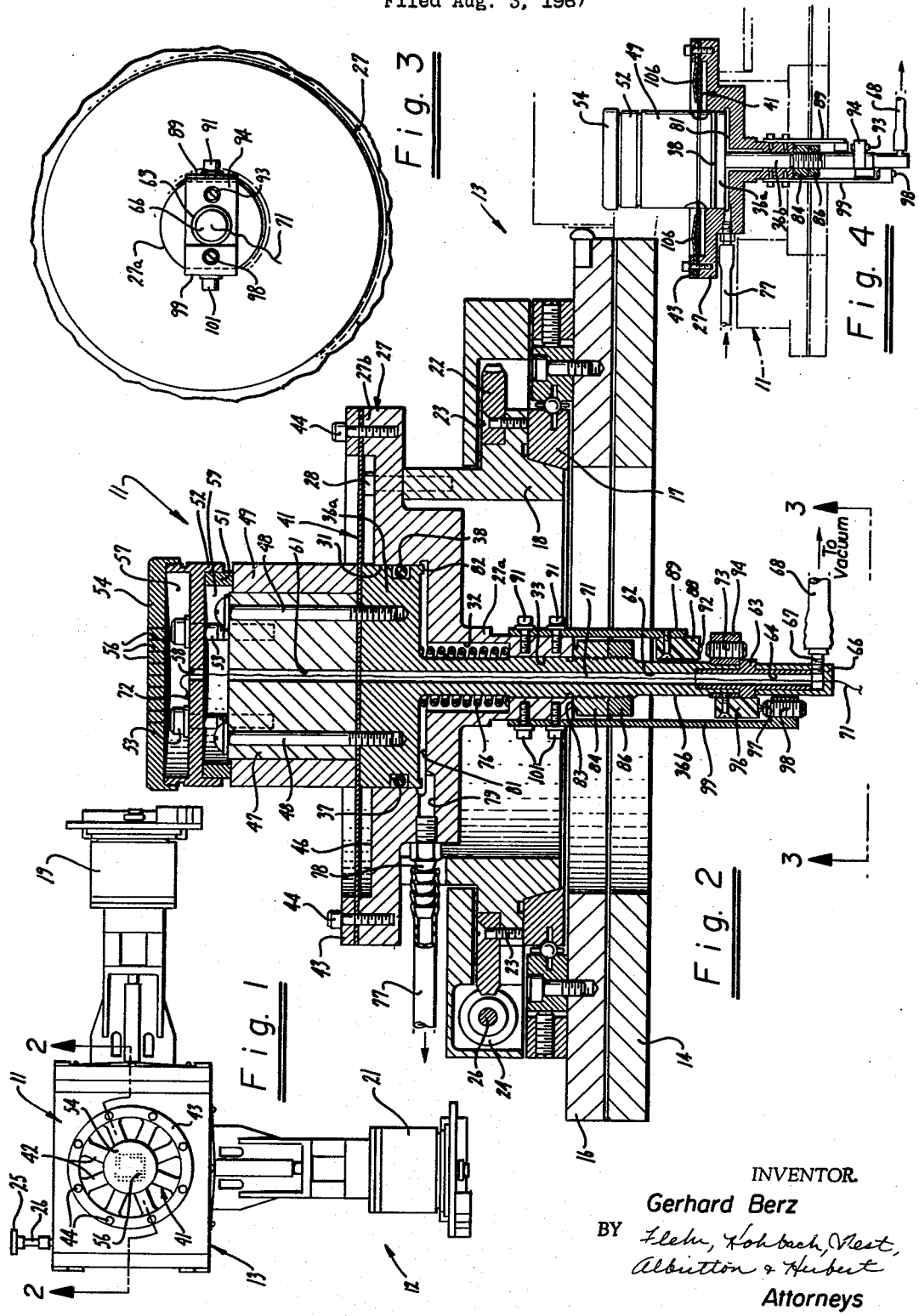
INVENTOR.
Gerhard Berz
BY Flehr, Hohbach, Test,
Albritton & Herbert
Attorneys

United States Patent Office 3,499,640
Patented Mar. 10, 1970

3,499,640
CHUCK ASSEMBLY FOR AUTOMATIC WAFER
DIE SORT MACHINE
Gerhard Berz, Menlo Park, Calif., assignor to Electroglas,
Inc., Menlo Park, Calif., a corporation of California
Filed Aug. 3, 1967, Ser. No. 658,124
Int. Cl. B25b *11/00;* G01r *35/00*
U.S. Cl. 269—21                                    7 Claims

ABSTRACT OF THE DISCLOSURE

Chuck assembly for automatic die sort machine which is movable toward and away from the probe assembly either by the use of a vacuum or by the use of a pressurized fluid.

BACKGROUND OF THE INVENTION

In patent application Ser. No. 477,427, filed Aug. 5, 1965, now Patent No. 3,437,929 assigned to the assignee of the present application, there is disclosed an automatic wafer die sort machine in which the probe heads are moved vertically with respect to the chuck which carries the wafer to be probed. It has been found that the movement of the probe heads relative to the chuck has limited the speed of the machine because the complete cycle had to be completed before the chuck could be moved along the X and Y axes. It also was found that the parts of the machine which were provided for carrying the probe heads had a relatively great mass which had to be shifted. This caused substantial wear of the cams and bearings utilized for creating the vertical movement of the probe heads. In addition, the movement which was provided for the probe heads was relatively abrupt.

SUMMARY OF THE INVENTION

The chuck assembly is for use with a wafer die sort machine of the type which has a plurality of probe heads and a stage assembly. A bearing plate is carried by the stage assembly for movement in a horizontal plane. The piston is slidably mounted in the bearing plate for vertical movement. The chuck plate is carried by the piston and is adapted to receive the wafers which are to be probed. Spring means is provided for yieldably urging the piston in one vertical direction and means is also provided for urging the piston in an opposite vertical direction against the force of the yieldable means.

In general, it is an object of the present invention to provide a chuck assembly for use with an automatic wafer die sort machine in which the chuck assembly is moved vertically relative to the probe heads carried by the machine.

Another object of the invention is to provide a chuck assembly of the above character which has a relatively small mass and which can be cycled repeatedly at relatively rapid rates.

Another object of the invention is to provide a chuck assembly of the above character in which it is possible to cause relatively fine and smooth movement of the wafer carried by the chuck into contact with the probe heads.

Additional objects and features of the invention will appear from the following description in which the preferred embodiment is set forth in conjunction with the accompanying drawing.

BRIEF DESCRIPTION OF THE DRAWING

FIGURE 1 is a top plan view of an automatic wafer die sort machine in particular showing the chuck assembly incorporating the present invention.

FIGURE 2 is a cross-sectional view taken along the line 2—2.

FIGURE 3 is a view looking along the line 3—3 of FIGURE 2.

FIGURE 4 is another embodiment of the chuck assembly utilizing a fluid under pressure for actuation of the same.

BRIEF DESCRIPTION OF THE PREFERRED EMBODIMENT

As shown in FIGURES 1–3 of the drawings, the chuck assembly 11 forms a part of an automatic wafer die sorting machine 12 of the type described in copending application Ser. No. 477,427, filed Aug. 5, 1965, now Patent No. 3,437,929. As disclosed therein, such a machine includes stage assembly 13. The stage assembly 13 includes a bottom or base plate 14. A movable plate 16 is mounted upon the base plate 14 for movement in a direction which may be termed the Y axis. Another movable plate 17 is mounted upon the plate 16 for movement in a direction at right angles to the movement for the plate 16 or along the X axis. A top plate 18 is rotatably mounted upon the movable plate 17 for rotation about 360°.

Means is provided for driving each of the movable plates 16 and 17 and the top plate 18 and consists of a stepping motor assembly 19 for moving the plate 16 along the Y axis and a stepping motor assembly 21 for moving the plate 17 along the X axis, both of which are of the type described in copending application Ser. No. 477,427, filed Aug. 5, 1965, now Patent No. 3,437,929. A worm gear wheel 22 is mounted upon the top plate 18 by screws 23 and is driven by a worm 24. The worm 24 is mounted on a rod 26 which is adapted to be rotated by hand by a knob 25 (FIGURE 1) mounted on rod 26 to cause rotation of the top plate 18.

The chuck assembly 11 is mounted upon the top plate 18 as shown in FIGURE 2 and consists of a bearing plate 27 which is substantially cup-shaped as shown in cross-section in FIGURE 2 and is secured to the top plate 18 by cap screws 28. The bearing plate 27 is provided with a downwardly depending centrally disposed portion 27a. The bearing plate 27 is provided with a large bore 31 which opens upwardly. It is also provided with an intermediate bore 32 which opens into the large bore 31 and a smaller bore 33 which opens into the intermediate bore 32. The bores 31, 32 and 33 are all in axial alignment.

A piston 36 is mounted in the bearing plate 27 in the bores 31, 32 and 33 for vertical movement therein. The piston 36 is provided with a cylindrical portion 36a and a stem portion 36b. The portion 36a is disposed within the intermediate bore 32. Means is provided for forming a seal between the piston and the portion of the bearing plate 27 forming the intermediate bore and consists of a recess 37 provided in the cylindrical portion which carries an O-ring 38.

Means is provided for retaining the piston 36 within the bearing plate 27 and to prevent rotation of the piston, while at the same time permitting linear vertical movement of the piston with respect to the bearing plate 27. Such means consists of a spider 41 formed of a suitable material such as beryllium copper. As can be seen particularly from FIGURE 1, the spider is provided with a plurality of radially spaced arms 42 which extend between the piston 36 and the outer margin of the bearing plate 27. The spider 41 has its outer margin secured to the outer margin of the bearing plate 27 by a retaining ring 43 which is secured to the plate 27 by cap screws 44.

It will be noted that the bearing plate 27 is provided with a raised annular portion 27b so that the spider 41 is positioned above the surface 46 and to permit vertical movement of the inner margin of the spider. The inner margin of the spider 41 is secured to the piston by a block 47 of insulating material and screws 48 which extend through the insulating material through the spider and are threaded into the piston 36 to clamp the inner margin of the spider to the piston. A metal sleeve 49 coaxial with the block 47 surrounds the block 47. A precision ring 51 of suitable insulating material such as alumina is mounted on top of the sleeve 49 and is clamped into place on top of the ring by a vacuum chuck base 52 which is secured to the insulating block 47 by cap screws 53. A chuck plate 54 is threaded onto the chuck base 52. The chuck plate is provided with a plurality of small hole 56 which extend through the plate which are in communication with a vacuum chamber 57 formed between the chuck plate 54 and the chuck base 52. The vacuum chamber 57 is in communication with a hole 58 provided in the chuck base 52 which is in communication with a chamber 59 below the chuck plate 54 and within the ring 51. The chamber 59 is in communication with a bore 61 provided in the insulating block 47. The bore 61 is in axial alignment with a bore 62 provided in the piston 36. A nipple 63 is mounted in the lower end of the stem portion 36b of the piston 36 and is provided with a passage 64 in communication with the passage 62 in the stem portion 36b. A fitting 66 is mounted on the lower end of the nipple 63. A hose connector 67 is threaded into the fitting 66 and carries a hose 68 which is connected to a suitable vacuum source.

An insulated lead 71 extends up through the fitting 63 and through the stem portion 36b of the piston 36 and is connected to a lug 72 secured to one of the cap screws 53 to provide a back side contact through the chuck base 52 and chuck plate 54 for the wafer which is to be carried by the chuck plate 54.

Yieldable means is provided for urging the piston 36 and the chuck plate 54 carried thereby in a vertical direction and consists of a compression spring 76 surrounding the stem portion 36b and which has one end engaging the bottom of the bore or well 32 and has the other end engaging the cylindrical portion 36a of the piston 36 to urge the piston in an upward vertical direction. Means is also provided for moving the piston 36 together with the chuck plate 54 carried thereby in a vertical direction opposite the direction in which it is urged by the yieldable means against the force of the yieldable means and consists of a vacuum source (not shown) which is connected to a hose 77. The hose 77 is connected to a connector 78. The connector 78 is threaded into the bearing plate 27 and is in communication with a flow passage 79 provided in the bearing plate. The passage 79 is in communication with a chamber 81 underlying the piston 36. It can be seen that when vacuum is applied to the hose 77, a vacuum is applied to the chamber 81 so that atmospheric pressure will push the piston 36 downwardly against the force of the spring 76 until the shoulder 82 provided on the bottom of the piston engages the bottom wall of the plate 27 which forms the chamber 81. The spider 41 permits vertical movement but prevents rotation of the piston 36. As soon as the vacuum is terminated on the hose 77, the spring 76 will force the piston 36 upwardly into its uppermost position as determined by a shoulder 83 provided on a nut 84 threaded onto the stem portion 36b of the piston 36. A jam nut 86 locks the nut 84 in place.

Means is provided for determining when the chuck plate 54 reaches its uppermost position and its lowermost position. Such means consists of a microswitch 88 mounted upon an arm 89 secured to the lower extremity of the bearing plate 27 by screws 91. The microswitch 88 is provided with an operating arm 92 which is adapted to be engaged by an adjustable screw 93 carried by a block 94 mounted upon the stem portion 36b of the piston. Thus, it can be seen that as the piston is moved downwardly, the microswitch 88 is operated to return to its normal condition and is returned to the off normal condition when the piston returns to its uppermost position.

Another microswitch 96 is mounted on the stem portion 36b of the piston and has an operating arm 97 adapted to be engaged by an adjusting screw 98 carried by an arm 99 secured to the lower portion of the bearing plate 27 by screws 101. With microswitch 96, it can be seen that as it is moved downwardly with the piston 66, it is operated by the adjusting screw 98 which remains stationary.

The use of the chuck assembly in an automatic wafer die sort machine is very similar to that described in copending application Ser. No. 477,427, filed Aug. 5, 1965, now Patent No. 3,437,929. The chuck plate 54 is lowered by applying vacuum to the tube 77 which lowers the piston. Thereafter, a wafer is placed upon the chuck plate and vacuum is applied to the tube 68 to hold the wafer in place on the chuck plate 54. As described in the above identified copending application, the wafer is then aligned with the axes of the machine by operation of the stepping motors 19 and 21 and by turning of the knob 25.

After the wafer has been properly aligned, the probing heads which are to make contacts with the wafer are individually adjusted. As soon as this has been accomplished, the vacuum on line 77 is terminated to permit the spring 76 to urge the chuck plate 54 with the wafer thereon upwardly so that the wafer comes into contact with the probe heads. The upward movement continues until the stop shoulder 83 carried by the nut 84 engages the bearing plate 27. The probing of the devices carried by the wafer is then carried out by repeated lowering and raising of the chuck plate and advancing the chuck plate along the X and Y axes by operation of the stepping motor assemblies 19 and 21.

An alternative embodiment of the assembly is shown in FIGURE 4 which is operated by pressure rather than a vacuum on the line or tube 77. In place of the spring 76 which urges the piston 36 upwardly, a plurality of spring members 106 are provided which are clamped between the ring 43 and the bearing plate 27. These spring members 106 are in general alignment with the arms 42 of the spider 41 and serve to yieldably urge the piston 36 downwardly in a vertical direction into a position in which the shoulder 82 engages the bottom wall forming the chamber 76 of the bearing plate 27. Thus, it can be seen that the spring members 106 merely urge the piston 36 in a vertical direction opposite the vertical direction in which the spring 76 urges the piston. The means for applying a yieldable force to the piston 36 against the force of the spring members 106 consists of a supply of fluid under pressure as, for example, air under pressure of 125 p.s.i. supplied to the chamber 81 to urge the piston 36 in an upward vertical direction against the force of the spring members 106 to urge the chuck plate 54 into contact with the probe heads. Upon termination of the supply of fluid under pressure to the conductor 77, the spring members 106 again return the piston 36 to its lowermost position. Operation of this embodiment of the chuck assembly is substantially identical to that of the embodiment hereinbefore described.

In both of the chuck assemblies, it can be seen that it is the chuck assembly itself which is shifted vertically and is moved to bring the wafer into engagement with the probe heads. This has the distinct advantage over the chuck assembly which is utilized in the arrangement described in the above identified copending application in that it has a mass which is substantially less than the mass required for moving the probe heads. Because of the smaller mass involved, there is less wear on the machine. In addition, it has been found that it is possible to greatly increase the speed of operation of the machine because of the smaller mass which must be moved. Thus, for example, it is possible to operate the machine at a rate exceeding 10 cycles per second. In addition, the construction is such that there is less wear and tear on the machine. Also, there is less abrupt movement of the chuck assembly which makes it possible to obtain relatively fine control of the contact between the probe heads and the wafer carried by the chuck assembly.

In either of the embodiments, it can be seen that the chuck assembly is shifted vertically in one direction by either a vacuum or by pressure and that spring means is provided for yieldably urging the chuck plate of the chuck assembly in the opposite direction.

It also can be seen that the construction of the chuck assembly is relatively simple and economical which facilitates its manufacture and sale. In addition, it is relatively simple to operate.

I claim:

1. In a chuck assembly for use with a wafer die sort machine of the type having a plurality of probe heads, a stage assembly, a bearing plate carried by the stage assembly for movement in a horizontal plane, motorized stepping means connected to said stage assembly for moving said bearing plate in X and Y directions, a piston slidably mounted in the bearing plate for vertical movement, a chuck plate carried by the piston and having a top surface with a plurality of holes therein, yieldable means yieldably urging the piston to move in one vertical direction, means for urging piston in the opposite vertical direction against the force of the yieldable means, means for supplying a vacuum to the piston in communication with the holes in the chuck plate, and means for making an electrical contact with the chuck plate.

2. A chuck assembly as in claim 1 wherein said means for moving said piston in the opposite vertical direction against the force of the yieldable means includes a vacuum source.

3. A chuck assembly as in claim 1 wherein said means for urging said piston in the opposite vertical direction against the force of the yieldable means consists of a source of fluid under pressure.

4. A chuck assembly as in claim 1 together with flexible spider-like means formed of flat spring-like arms secured to the piston and to the bearing plate for preventing rotational movement of the chuck assembly relative to the bearing plate but permitting linear vertical movement of the same.

5. A chuck assembly as in claim 4 wherein said yieldable means includes spring members overlying the spider means and yieldably urging the piston in a downward direction and wherein said means for supplying a force to the piston opposite the force supplied by the yieldable means includes a fluid under pressure supplied to the under side of said piston to move the piston in a vertical direction against the force of the yieldable means engaging the spider means.

6. A chuck assembly as in claim 1 wherein said means yieldably urging the piston in one direction consists of a compression spring engaging the under side of the piston and wherein the means for supplying the force to the piston in the opposite direction to the force supplied by the yieldable means consists of means for supplying a vacuum to the under side of the piston to cause the piston to be moved downwardly against the force of the spring.

7. A chuck assembly as in claim 1 together with switch means operable by movement of said piston to indicate the position of said piston.

References Cited

UNITED STATES PATENTS

| | | | |
|---|---|---|---|
| 1,759,058 | 5/1930 | Miller | 279—3 X |
| 2,976,037 | 3/1961 | Seel et al. | 269—21 X |
| 3,155,383 | 11/1964 | Whitmore | 269—58 |
| 3,396,598 | 8/1968 | Grispo | 269—58 X |

FOREIGN PATENTS 892,771   3/1962   Great Britain.

ROBERT C. RIORDON, Primary Examiner

D. D. EVENSON, Assistant Examiner

U.S. Cl. X.R.

324—158